(12) United States Patent
Yamazaki et al.

(10) Patent No.: US 11,872,827 B2
(45) Date of Patent: Jan. 16, 2024

(54) INK FOR INK JET RECORDING, INK JET RECORDING APPARATUS, AND INK JET RECORDING METHOD

(71) Applicant: Seiko Epson Corporation, Toyko (JP)

(72) Inventors: Soichi Yamazaki, Shiojiri (JP); Shunsuke Uchizono, Shiojiri (JP); Hiroaki Kumeta, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/199,557

(22) Filed: Mar. 12, 2021

(65) Prior Publication Data

US 2021/0197607 A1 Jul. 1, 2021

Related U.S. Application Data

(63) Continuation of application No. 16/502,114, filed on Jul. 3, 2019, now Pat. No. 11,040,562.

(30) Foreign Application Priority Data

Jul. 6, 2018 (JP) ................................. 2018-129098

(51) Int. Cl.
| | | |
|---|---|---|
| *C09D 11/30* | (2014.01) | |
| *C09D 11/38* | (2014.01) | |
| *C09D 11/322* | (2014.01) | |
| *B41J 2/01* | (2006.01) | |
| *B41M 5/00* | (2006.01) | |
| *C09D 11/033* | (2014.01) | |
| *C09D 11/037* | (2014.01) | |

(52) U.S. Cl.
CPC .............. *B41M 5/0023* (2013.01); *B41J 2/01* (2013.01); *C09D 11/033* (2013.01); *C09D 11/037* (2013.01); *C09D 11/30* (2013.01); *C09D 11/322* (2013.01); *C09D 11/38* (2013.01)

(58) Field of Classification Search
CPC ...... B41M 5/0023; B41J 2/01; B41J 2/04516; B41J 2/04586; B41J 11/00; C09D 11/033; C09D 11/037; C09D 11/30; C09D 11/322; C09D 11/38
See application file for complete search history.

(56) References Cited

U.S. PATENT DOCUMENTS

| | | |
|---|---|---|
| 4,451,388 A | 5/1984 | Payne |
| 5,925,178 A | 7/1999 | Martin et al. |
| 5,972,087 A | 10/1999 | Uraki et al. |

(Continued)

FOREIGN PATENT DOCUMENTS

| | | | |
|---|---|---|---|
| CN | 102190929 A | * 9/2011 | ........... C09D 11/322 |
| CN | 102675962 A | 9/2012 | |

(Continued)

OTHER PUBLICATIONS

Extended European Search Report for Application No. EP 19 18 4730 dated Nov. 20, 2019 (5 pages).

(Continued)

*Primary Examiner* — Yaovi M Ameh
(74) *Attorney, Agent, or Firm* — Harness, Dickey & Pierce, P.L.C.

(57) ABSTRACT

An ink for ink jet recording according to an embodiment is an ink for ink jet recording containing pigment, colloidal silica, amine, and amino acid.

15 Claims, 1 Drawing Sheet

(56) References Cited

U.S. PATENT DOCUMENTS

| | | | |
|---|---|---|---|
| 6,039,796 A | 3/2000 | Kubota et al. | |
| 6,234,601 B1 | 5/2001 | Hayashi et al. | |
| 6,612,691 B1 | 9/2003 | Koitabashi et al. | |
| 8,460,450 B2 | 6/2013 | Taverizatshy et al. | |
| 8,740,368 B2 | 6/2014 | Ikoshi et al. | |
| 8,955,954 B2 | 2/2015 | Yamazaki | |
| 2007/0237911 A1* | 10/2007 | Nakano | B41M 5/52 428/32.34 |
| 2010/0003407 A1 | 1/2010 | Ito | |
| 2010/0190922 A1 | 7/2010 | Shinozaki et al. | |
| 2011/0069111 A1* | 3/2011 | Matsumoto | C09D 11/54 347/100 |
| 2011/0069112 A1 | 3/2011 | Matsumoto et al. | |
| 2011/0227995 A1 | 9/2011 | Ikoshi et al. | |
| 2011/0242196 A1* | 10/2011 | Okada | C09D 11/30 347/20 |
| 2011/0242213 A1 | 10/2011 | Okada et al. | |
| 2012/0162307 A1 | 6/2012 | Yamazaki | |
| 2012/0262516 A1 | 10/2012 | Yamazaki et al. | |
| 2013/0050355 A1 | 2/2013 | Imamura et al. | |
| 2013/0241991 A1 | 9/2013 | Okada et al. | |
| 2013/0281593 A1 | 10/2013 | Yamazaki et al. | |
| 2013/0286118 A1 | 10/2013 | Okada et al. | |
| 2014/0285572 A1 | 9/2014 | Hanaoka et al. | |
| 2015/0091973 A1* | 4/2015 | Ikoshi | B41J 2/01 523/205 |
| 2015/0158293 A1* | 6/2015 | Suzuki | B41J 2/04541 347/9 |
| 2016/0176188 A1 | 6/2016 | Mabuchi et al. | |
| 2017/0253754 A1 | 9/2017 | Kawaharada et al. | |
| 2018/0187031 A1 | 7/2018 | Teramoto et al. | |
| 2020/0009880 A1 | 1/2020 | Yamazaki et al. | |
| 2020/0009890 A1 | 1/2020 | Yamazaki et al. | |
| 2020/0339829 A1 | 10/2020 | Kumeta et al. | |
| 2020/0385593 A1 | 12/2020 | Uchizono et al. | |
| 2021/0062025 A1 | 3/2021 | Harvey et al. | |
| 2021/0292584 A1 | 9/2021 | Rudisill et al. | |
| 2021/0301155 A1 | 9/2021 | Oki et al. | |
| 2022/0348780 A1 | 11/2022 | Rudisill et al. | |

FOREIGN PATENT DOCUMENTS

| | | | | |
|---|---|---|---|---|
| CN | 111849247 A | | 10/2020 | |
| EP | 2444462 A1 | | 4/2012 | |
| JP | H05-331391 A | | 12/1993 | |
| JP | H09-157560 A | | 6/1997 | |
| JP | H09-272826 A | | 10/1997 | |
| JP | H09-286941 A | | 11/1997 | |
| JP | H10-060342 A | | 3/1998 | |
| JP | H11-001647 A | | 1/1999 | |
| JP | H11-012516 A | | 1/1999 | |
| JP | H11-256083 A | | 9/1999 | |
| JP | 2000-503901 A | | 4/2000 | |
| JP | 2003-105235 A | | 4/2003 | |
| JP | 2004211022 A | * | 7/2004 | C09D 11/00 |
| JP | 2006-240298 A | | 9/2006 | |
| JP | 2006-321876 A | | 11/2006 | |
| JP | 2007-152769 A | | 6/2007 | |
| JP | 2008-031356 A | | 2/2008 | |
| JP | 2008-038090 A | | 2/2008 | |
| JP | 2009-028990 A | | 2/2009 | |
| JP | 2009-285926 A | | 12/2009 | |
| JP | 2010-510357 A | | 4/2010 | |
| JP | 2011-057916 A | | 3/2011 | |
| JP | 2011-063771 A | | 3/2011 | |
| JP | 2011-063772 A | | 3/2011 | |
| JP | 2011-162620 A | | 8/2011 | |
| JP | 2011-195684 A | | 10/2011 | |
| JP | 2012-136572 A | | 7/2012 | |
| JP | 2012-136589 A | | 7/2012 | |
| JP | 2013053175 A | * | 3/2013 | B41J 11/002 |
| JP | 2013-155280 A | | 8/2013 | |
| JP | 2013-184998 A | | 9/2013 | |
| JP | 2013-203960 A | | 10/2013 | |
| JP | 2013-224340 A | | 10/2013 | |
| JP | 2014-184695 A | | 10/2014 | |
| JP | 2014-240491 A | | 12/2014 | |
| JP | 2015-025076 A | | 2/2015 | |
| JP | 2016-193980 A | | 11/2016 | |
| JP | 2018-109119 A | | 7/2018 | |
| JP | 2018-123293 A | | 8/2018 | |
| JP | 2019-536825 A | | 12/2019 | |
| JP | 2020-007444 A | | 1/2020 | |
| JP | 2020-200372 A | | 12/2020 | |

OTHER PUBLICATIONS

Lubrizol Corporation, "Surfactants," Cleveland, OH, Oct. 2019, URL: https://lubrizolcdmo.com/wp-content/uploads/2019/10/TB-11-Surfactants_lowres.pdf, pp. 1-5.

* cited by examiner

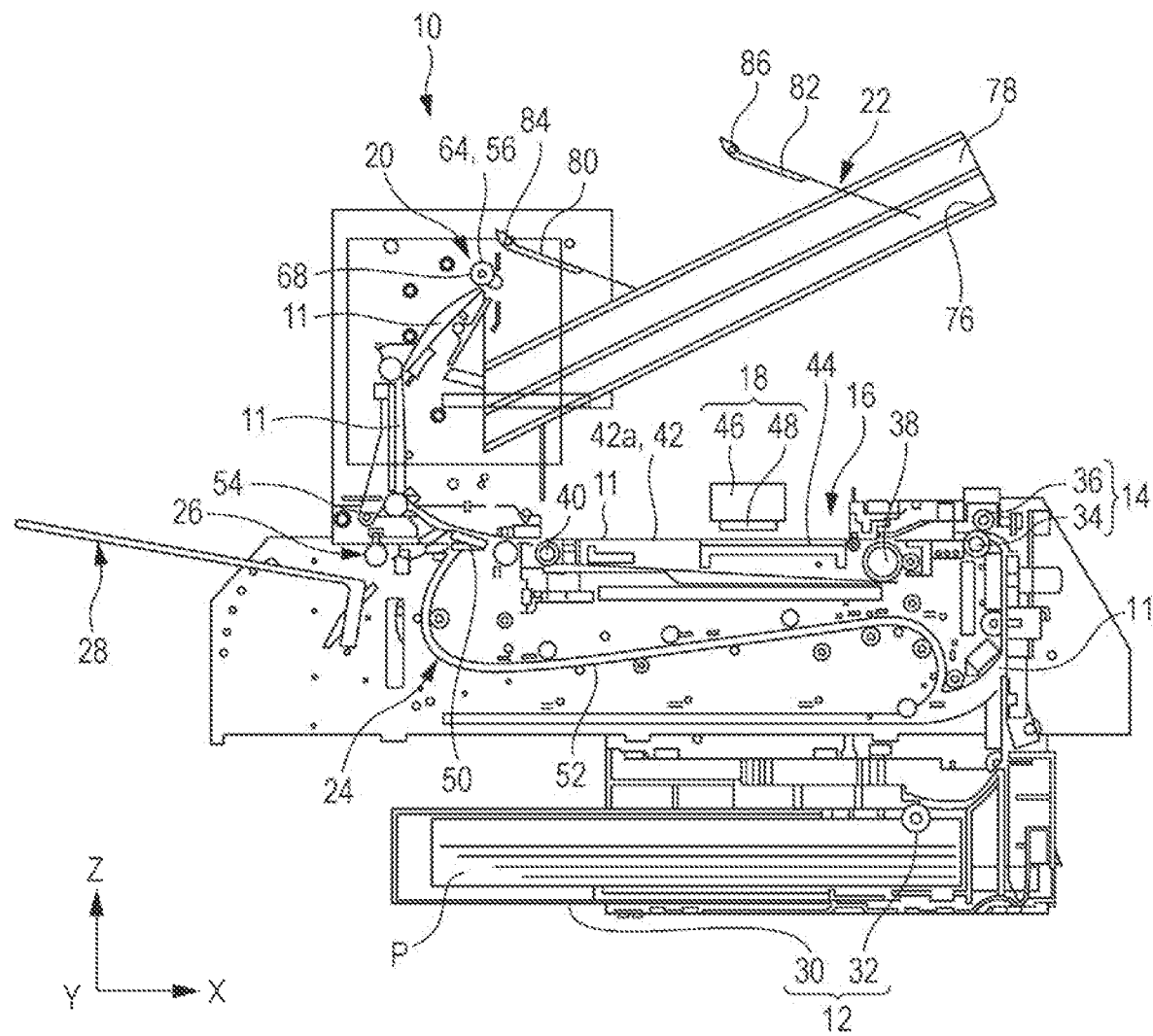

INK FOR INK JET RECORDING, INK JET RECORDING APPARATUS, AND INK JET RECORDING METHOD

This application is a continuation application of U.S. patent application Ser. No. 16/502,114 filed on Jul. 3, 2019, which claims the benefit of priority from, JP Application Serial Number 2018-129098, filed Jul. 6, 2018. The entire disclosures of the above applications are incorporated herein by reference.

BACKGROUND

1. Technical Field

The present disclosure relates to an ink for ink jet recording, an ink jet recording apparatus, and an ink jet recording method.

2. Related Art

In recent years, technology for increasing the speed of an ink jet printer, improving the image quality, and suppressing curling has advanced.

For example, JP-A-2011-57916 discloses that an ink containing a compound that is one of betaines, saccharides, and ureas and has a molecular weight in the range of 100 to 200 with another specific moisturizer at a predetermined ratio can suppress curling and cockling of a recording medium.

However, the ink described in JP-A-2011-57916 has a large wet friction on a printing surface, and therefore in the case where high-duty printing is performed at a high speed, it becomes difficult to appropriately transport a recording sheet. In addition, there is a problem that suppression of curling and cockling of the recording sheet is not sufficient, thus curling and cocking occur, and recording sheets cannot be precisely stacked. Particularly, when high-speed sheet transport of 0.5 m/s or faster is required as in line ink jet, the problem of sheet stackability becomes prominent.

SUMMARY

Therefore, according to an aspect of the present disclosure, an ink for ink jet recording, an ink jet recording apparatus, and an ink jet recording method that can improve the stackability are provided.

The inventors have found that the problem can be resolved by adding colloidal silica to the ink for ink jet recording, and thus have completed the present disclosure.

An ink for ink jet recording according to the present disclosure contain pigment, colloidal silica, and amino acid.

An embodiment of an ink jet recording apparatus of the present disclosure includes an ink jet head that ejects the ink for ink jet recording described above and records an image by attaching, to a recording medium, the ink ejected from a recording head while moving the head or the recording medium at a relative speed equal to or higher than 0.5 m/s.

Another embodiment of an ink jet recording apparatus of the present disclosure includes a line head in which nozzles are formed in an intersecting direction intersecting a transport direction of a recording medium such that the nozzles cover a printing region of the recording medium in the intersecting direction, and the line head records an image by ejecting the ink for ink jet recording described above through the nozzles and attaching the ejected ink to the recording medium.

Another embodiment of an ink jet recording apparatus of the present disclosure includes a line head and the ink described above. In the line head, nozzles are formed in an intersecting direction intersecting a transport direction of a recording medium such that the nozzles cover a printing region of the recording medium in the intersecting direction.

Further, an ink jet recording method according to an embodiment of the present disclosure includes ejecting the ink for ink jet recording described above from an ink jet head to a recording medium moving with respect to the ink jet head at a relative speed equal to or higher than 0.5 m/s.

BRIEF DESCRIPTION OF THE DRAWINGS

FIGURE is a sectional side view of an ink jet recording apparatus according to an embodiment illustrating a configuration thereof.

DESCRIPTION OF EXEMPLARY EMBODIMENTS

An embodiment of the present disclosure will be described in detail below. To be noted, the present disclosure is not limited to the embodiment below, and can be modified in various ways within the gist thereof.

Ink for Ink Jet Recording

An ink for ink jet recording according to an embodiment of the present disclosure (hereinafter simply referred to as an "ink") contains pigment, colloidal silica, and amino acid.

Pigment

The ink of the present embodiment contains pigment as colorant. Pigments normally used for an aqueous pigment ink for ink jet can be used as the pigment without any particular limitation.

As the pigment, for example, organic pigments such as azo pigments (e.g. azo-lakes, insoluble azo pigments, condensation azo pigments, chelate azo pigments, and the like), polycyclic pigments (e.g. phthalocyanine pigments, perylene pigments, perinone pigments, anthraquinone pigments, quinacridone pigments, dioxyazine pigments, thioindigo pigments, isoindolinone pigments, quinophthalone pigments, and the like), nitro pigments, nitroso pigments, and aniline black; inorganic pigments such as carbon black (e.g. furnace black, thermal lamp black, acetylene black, channel black, and the like), metal oxides, metal sulfides, and metal chlorides; and extender pigments such as silica, calcium carbonate, and talc can be used.

Specific examples of the pigment include C.I. pigment yellow 64, 74, 93, 109, 110, 128, 138, 139, 150, 151, 154, 155, 180, and 185, C.I. pigment red 122, 202, and 209, C.I. pigment violet 19, C.I. pigment blue 15:3, 15:4, and 60, C.I. pigment green 7 (phthalocyanine green), 10 (green gold), 36, and 37, C.I. pigment brown 3, 5, 25, and 26, and C.I. pigment orange 1, 2, 5, 7, 13, 14, 15, 16, 34, 36, 38, 64, and 71.

The pigment may be added to the ink as a pigment dispersion obtained by dispersing the pigment in water by a dispersing agent, or as a pigment dispersion obtained by dispersing in water a self-dispersive surface-treated pigment in which a hydrophilic group is introduced to the surface of pigment particles or obtained by dispersing a pigment coated with polymer in water.

For each of the pigment and the dispersing agent constituting the pigment dispersion, one kind may be used alone, or two or more kinds may be used in combination.

The pigment dispersion has an advantageous effect in terms of clear image formation on recording media of various kinds, and therefore the content thereof may be 0.05 to 25% by mass and may be 0.1 to 20% by mass with respect to the total amount (100% by mass) of the ink composition.

Colloidal Silica

Colloidal silica is a colloid solution obtained by dispersing silicon oxide ($SiO_2$) particles in water or an organic solvent. It has been found that colloidal silica has a spherical shape, is stably dispersed in an ink jet ink by a particular acid/alkali, and has an effect of improving sheet stackability by reducing the wet friction of the printing surface and an effect of suppressing curling of sheets by the moisture absorbing property of silica. As a result of this, high-speed transport of sheet becomes possible. That is, effects of adding colloidal silica are as follows, and these have not been found hitherto. That is, as a result of adding colloidal silica to an ink, part of $SiO_2$ particles is present on the surface even when not completely dried, thus the wet friction drag of the printing surface is reduced, and the stackability is improved. In addition, since $SiO_2$ particles have a moisture absorbing property similarly to silica gel, the effect of suppressing curling is caused by the moisture retaining effect.

The average particle diameter of colloidal silica may be 10 nm to 70 nm. As a result of the average particle diameter being 70 nm or smaller, sedimentation is suppressed, and thus stability of dispersion can be maintained. In addition, as a result of the average particle diameter being 10 nm or larger, an effect of improving sliding friction of the printing surface is achieved.

The average particle diameter of colloidal silica can be measured by a particle size distribution measurement apparatus using a dynamic light scattering method as a measurement principal. Examples of such a particle size distribution measurement apparatus include "zeta potential/particle diameter/molecular weight measurement system ELSZ2000ZS" (product name) manufactured by Otsuka Electronics Co., Ltd. employing a homodyne optical system for frequency analysis. To be noted, in the present description, "average particle diameter" refers to a number average particle diameter unless otherwise described.

The surface of the colloidal silica may be treated with alumina. As a result of this, storage stability can be improved. That is, by treating the surface with alumina, the range of pH in which stable dispersion is possible is widened, and thus stable dispersion becomes possible even in the case where the ink is neutral.

As the colloidal silica, commercially available products can be used, and examples thereof include SNOWTEX 20, SNOWTEX 30, SNOWTEX 40, SNOWTEX O, SNOWTEX N, and SNOWTEX C (all manufactured by Nissan Chemical Corporation).

The content of the colloidal silica may be appropriately determined in consideration of the kind thereof and the effect of addition thereof. For example, the content may be 0.1 to 15% by weight and may be 3 to 10% by weight of the ink composition.

Amino Acid

The ink of the present embodiment contains amino acid. Amino acid has an excellent pH adjusting function as a result of having functional groups of both an amino group and a carboxyl group, and also functions as a moisturizer and a curling inhibitor of the recording medium.

As the amino acid, tertiary amino acids and quaternary amino acids that are chemically stable may be used. Among these, at least one of dimethylglycine and trimethylglycine may be used because these have small molecular weights.

For the amino acid, one kind may be used alone or two or more kinds may be used in combination.

The content of amino acid may be 1 to 30% by mass and may be 4 to 20% by mass with respect to the total mass (100% by mass) of the ink. When the content of amino acid is in the range described above, amino acid functions as a moisturizer and a curling inhibitor of the recording medium, and also has an excellent pH adjusting function as an ampholyte that dissolve in both acid and alkali.

The ink of the present embodiment may contain, as a pH adjusting agent, at least one acid alkali selected from unsaturated fatty acid, alkali metal hydroxide, and amine in addition to amino acid, and may contain all of these four acid alkalis. The adjustment range of pH may be 6 to 10 to effectively suppress attack of the ink on constituent materials of the ink jet recording apparatus and secure clogging restorability. By combining the four kinds of pH adjusting agents of the present embodiment, while having a pH buffering function that is stable in a long term, other functions can be sufficiently exerted, and a synergistic effect can be exerted.

Acetylene Glycol

Acetylene glycol is a nonionic surfactant having a horizontally symmetrical structure in which an acetylene group is positioned in the center, and is applied for aqueous materials of various fields as a wetting agent that does not foam easily. Acetylene glycol is excellent in functions such as wetting, antifoaming, and dispersion. Acetylene glycol is a very stable glycol in terms of molecular structure, has a small molecular weight and an effect of reducing the surface tension of water, and therefore is capable of appropriately controlling permeability and spread of the ink in the recording medium. In addition, acetylene glycol has an effect of suppressing a satellite phenomenon.

Specific examples of acetylene glycol include 2,4,7,9-tetramethyl-5-decyne-4,7-diol, 3,6-dimethyl-4-octyne-3,6-diol, and 3,5-dimethyl-1-hexyne-3-ol.

Examples of commercially available products of acetylene glycol include SURFYNOL 104 (series), 420, 440, 465, and 485 (product names of Air Products and Chemicals. Inc.), OLFINE STG, PD-001, SPC, E1004, and E1010 (product names of Nissin Chemical Industry Co., Ltd.), and acetylenol E00, E40, E100, and LH (product names of Kawaken Fine Chemicals Co., Ltd.).

For the acetylene glycol, one kind may be used alone or two or more kinds may be used in combination.

The content of acetylene glycol may be 0.1 to 3.0% by mass and may be 0.3 to 2.0% by mass with respect to the total mass (100% by mass) of the ink. When the content is in the range described above, good glossiness and permeability can be achieved.

Unsaturated Fatty Acid

By using unsaturated fatty acid with the acetylene glycol described above, the following effects can be achieved. Acetylene glycol is a surfactant having a three-dimensional structure and a small molecular weight. Therefore, acetylene glycol is a surfactant that does not easily foam and is excellent in wettability. Oleic acid is a linear surfactant of an unsaturated fatty acid, which is a surfactant that easily foams and is used for soaps. However, when these two are combined, foaming becomes much less likely to occur.

Therefore, tailing of the ejected ink becomes shorter, and thus satellite droplets are reduced. The reason for this is assumed to be because, by using acetylene glycol and an unsaturated fatty acid surfactant having a structure that is greatly different from that of acetylene glycol in combination, arrangement of surfactant molecules at the surface of the ejected ink is disturbed by steric hindrance, and thus the film strength is reduced.

The unsaturated fatty acid functions as a surfactant, a lubricant, and a penetrant in addition to having a function of adjusting pH as an acid.

The unsaturated fatty acid may include one double bond. The monounsaturated fatty acid is not particularly limited, and examples thereof include crotonic acid, myristoleic acid, palmitoleic acid, oleic acid, elaidic acid, vaccenic acid, gadoleic acid, eicosenic acid, erucic acid, and nervonic acid. This is because, in the case where the unsaturated fatty acid include two or more carbon double bonds, methylene hydrogen between carbon double bonds is easily removed and thus the unsaturated fatty acid is easily oxidized. Linoleic acid corresponds to this case. Unsaturated fatty acid having only one carbon double bond is advantageous because this unsaturated fatty acid does not have methylene hydrogen and is difficult to oxidize. Many of unsaturated fatty acids stable against oxidation are solid at a normal temperature, and are not suitable for addition to an ink. Examples of unsaturated fatty acid satisfying all of these characteristics include oleic acid.

Considering above, the unsaturated fatty acid may be oleic acid or linoleic acid.

The unsaturated fatty acid may be purified fatty acid, or vegetable oil containing oleic acid as a main components such as olive oil.

For the unsaturated fatty acid, one kind may be used alone or two or more kinds may be used in combination.

The content of unsaturated fatty acid may be 0.05 to 3% by mass and may be 0.1 to 1% by mass with respect to the total mass (100% by mass) of the ink. When the content is in the range described above, the balance between two functions as excellent surfactant and pH adjusting agent (acidic side) is excellent.

Amine

Amine has an effect of suppressing nozzle omission. In addition, amine functions as a weak alkaline pH adjusting agent. In addition, making the amine amphiphilic leads to excellent long-term stability of the ink, and therefore alkanol amine may be used among amine. Further, since using alkanol amine of a high boiling point suppresses clogging, trialkanolamine may be used. Among trialkanolamine, at least one of tripropanolamine and triethanolamine may be used.

To be noted, amine has a disadvantage that the amine is likely to form a sediment with unsaturated fatty acid, and stability is low when only one kind of amine is contained as alkali. Therefore, alkali metal hydroxide described below or the like is also contained as alkali in addition to the amine.

For the amine, one kind may be used alone or two or more kinds may be used in combination.

The content of amine may be 0.05 to 2% by mass and may be 0.1 to 1% by mass with respect to the total mass (100% by mass) of the ink. By setting the content of amine in the range described above, the pH of the ink can be in an appropriate range.

Alkali Metal Hydroxide

Alkali metal hydroxide has an effect of suppressing nozzle omission. In addition, although alkali metal hydroxide is good alkali, metal ion thereof is easily captured by an organic solvent or pigment in a complex-like state, and thus the long-term stability thereof is poor. Alkali metal ion has a characteristic of less easily forming a sediment with unsaturated fatty acid than amine. Therefore, by using amine and alkali metal hydroxide together as alkali, disadvantages of the two can be compensated by each other, and thus only advantages can be exerted.

As the alkali metal hydroxide, one or more selected from the group consisting of sodium hydroxide (NaOH), potassium hydroxide (KOH), and lithium hydroxide (LiOH) may be used, and at least one of NaOH and KOH may be used.

For the alkali metal hydroxide, one kind may be used alone or two or more kinds may be used in combination.

The content of alkali metal hydroxide may be 0.01 to 1% by mass and may be 0.03 to 0.5% by mass with respect to the total mass (100% by mass) of the ink. By setting the content of alkali metal hydroxide in the range described above, the pH of the ink can be in an appropriate range. Further, by setting the content of the amine and the content of the alkali metal hydroxide in the ranges described above, the two act on each other as alkali components, and synergistic effects such as pH adjustment and suppression of nozzle omission are exerted.

Here, the unsaturated fatty acid, amino acid, alkali metal hydroxide, and amine may be each contained in the ink as a single substance, or as acid alkali salt. Particularly, in the case where the ink contains acid alkali salt constituted by at least one of unsaturated fatty acid and amino acid and at least one of alkali metal hydroxide and amine, the pH buffering effect described above is exerted more. Examples of the acid alkali salt include, but are not limited to, potassium oleate, sodium oleate, lithium oleate, tripropanolamine oleate, triethanolamine oleate, potassium aminoate, sodium aminoate, and lithium aminoate.

Among these, one or more selected from the group consisting of potassium oleate, tripropanolamine oleate, triethanolamine oleate, and potassium aminoate may be used because these are excellent in solubility in the ink and in the pH adjusting function, and do not adversely affect the pigment or other ink materials.

Other Additives

The ink of the present embodiment may contain other additives different from the additives described above. Examples of such additives will be described below.

Wetting Agent

The ink of the present embodiment may contain an aqueous organic solvent having a wetting effect to prevent clogging of the ink jet head in the vicinity of the nozzle.

Examples of the wetting agent include polyols such as glycerol, 1,2,6-hexanetriol, trimethylolpropane, pentamethylene glycol, trimethylene glycol, ethylene glycol, propylene glycol, diethylene glycol, triethylene glycol, tetraethylene glycol, pentaethylene glycol, polyethylene glycol having a number average molecular weight of 2,000 or less, dipropylene glycol, tripropylene glycol, isobutylene glycol, 2-butene-1,4-diol, 2-ethyl-1,3-hexanediol, 2-methyl-2,4-pentanediol, mesoerythritol, and pentaerythritol; so-called solid wetting agents such as saccharides, sugar alcohols, hyaluronic acids, and ureas, examples of the saccharides including glucose, mannose, fructose, ribose, xylose, arabinose, galactose, aldonic acid, glucitol (sorbit), maltose, cellobiose, lactose, sucrose, trehalose, and maltotriose; alkyl alcohols having 1 to 4 carbon atoms such as ethanol, methanol, butanol, propanol, and isopropanol; and 2-pyrrolidone, N-methyl-2-pyrrolidone, 1,3-dimethyl-2-imidazolidinone, formamide, acetamide, dimethyl sulfoxide, sorbit, sorbitan, acetine, diacetine, triacetine, and sulfolane.

For the wetting agent, one kind may be used alone or two or more kinds may be used in combination.

The content of wetting agent may be 10 to 50% by mass with respect to the total mass (100% by mass) of the ink.

When the content is in the range described above, appropriate physical property values (such as viscosity) of the ink can be secured, and thus the quality and reliability of the recording can be secured.

Water

In addition, water contained in the ink of the present embodiment is a main solvent, and may be pure water or ultra-pure water such as ion exchanged water, ultrafiltrate water, water filtrated by a reverse osmosis membrane, or distilled water. Particularly, water subjected to sterilization by irradiation of ultraviolet light, addition of hydrogen peroxide, or the like may be used for preventing generation of mold or bacteria and enabling long-term storage of the ink.

Penetrant

The ink of the present embodiment may contain a penetrant to promote penetration of an aqueous solvent into the recording medium. As a result of the aqueous solvent quickly penetrating into the recording medium, a recorded product with less blurring of an image can be obtained.

As the penetrant, at least one of alkyl ethers of polyols (also called glycol ethers) and 1,2-alkyldiol may be used. Examples of the alkyl ethers of polyols include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol monopropyl ether, ethylene glycol monoisopropyl ether, diethylene glycol monoisopropyl ether, ethylene glycol monobutyl ether, diethylene glycol monobutyl ether, triethylene glycol monobutyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol monopropyl ether, propylene glycol monoisopropyl ether, dipropylene glycol monomethyl ether, dipropylene glycol monoethyl ether, dipropylene glycol monopropyl ether, dipropylene glycol monoisopropyl ether, propylene glycol monobutyl ether, and dipropylene glycol monobutyl ether. Examples of 1,2-alkyldiol include 1,2-pentanediol and 1,2-hexanediol. In addition to these, examples of the penetrant include diols of linear hydrocarbons such as 1,3-propanediol, 1,4-butanediol, 1,5-pentanediol, 1,6-hexanediol, 1,7-heptanediol, and 1,8-octanediol.

For the penetrant, one kind may be used alone or two or more kinds may be used in combination.

The content of penetrant may be 3 to 20% by mass with respect to the total mass (100% by mass) of the ink. When the content is in the range described above, good permeability of the ink into the recording medium can be achieved, occurrence of blurring of the image recorded by using the ink can be prevented, and the viscosity of the ink being too high can be suppressed.

As described above, according to the present embodiment, an ink that can suppress occurrence of the satellite phenomenon can be suppressed and form an image of high quality at a high speed can be provided. Specifically, according to the present embodiment, an ink that can suppress occurrence of the satellite phenomenon at the time of ink ejection even when the recording is performed at a high speed and thus is excellent in long-term stability can be provided as a result of the ink composition in which acetylene glycol and unsaturated fatty acid are used in combination as a surfactant and the unsaturated fatty acid, amino acid, amine, and alkali metal hydroxide are used in combination as a pH adjusting agent to address disadvantages of using the surfactant.

Ink Jet Recording Apparatus

An ink jet recording apparatus according to an embodiment of the present disclosure (hereinafter simply referred to as "recording apparatus") will be described below with reference to FIGURE. In an X-Y-Z coordinate system illustrated in FIGURE, an X direction indicates the length direction of the recording medium, a Y direction indicates the width direction of the recording medium in a transport path in the recording apparatus, and a Z direction indicates the apparatus height direction.

For example, a recording apparatus 10 is a line-type ink jet printer capable of high-speed and high-density printing. The recording apparatus 10 includes a feeding unit 12 that accommodates a recording medium P such as paper sheets, a transport unit 14, a belt transport unit 16, a recording unit 18, a face-down (Fd) discharge unit 20 serving as a "discharge unit", a face-down (Fd) placement portion 22 serving as a "placement portion", a reverse path portion 24 serving as a "reverse transport mechanism", a face-up (Fu) discharge unit 26, and a face-up (Fu) placement portion 28.

The feeding unit 12 is provided in a lower portion of the recording apparatus 10. The feeding unit 12 includes a feeding tray 30 accommodating the recording medium P and a feeding roller 32 that sends out the recording medium P accommodated in the feeding tray 30 to a transport path 11.

The recording medium P accommodated in the feeding tray 30 is fed to the transport unit 14 along the transport path 11 by the feeding roller 32. The transport unit 14 includes a transport driving roller 34 and a transport driven roller 36. The transport driving roller 34 is rotationally driven by an unillustrated driving source. In the transport unit 14, the recording medium P is nipped between the transport driving roller 34 and the transport driven roller 36 and transported to the belt transport unit 16 positioned on the downstream side of the transport path 11.

The belt transport unit 16 includes a first roller 38, a second roller 40, an endless belt 42, and a support body 44. In the transport path 11, the first roller 38 is positioned on the upstream side, and the second roller 40 is positioned on the downstream side. The endless belt 42 is rotationally movably attached to the first roller 38 and the second roller 40, and the support body 44 supports an upper section 42a of the endless belt 42 between the first roller 38 and the second roller 40.

The endless belt 42 is driven in the upper section 42a so as to move from the +X side to the −X side by the first roller 38 or the second roller 40 driven by an unillustrated driving source. Therefore, the recording medium P transported from the transport unit 14 is transported to the further downstream side of the transport path 11 in the belt transport unit 16.

The recording unit 18 includes a line-type ink jet head 48, and a head holder 46 holding the ink jet head 48. To be noted, the recording unit 18 may be a serial type in which an ink jet head is provided in a carriage that reciprocates in the Y direction. The ink jet head 48 is provided so as to oppose the upper section 42a of the endless belt 42 supported by the support body 44. When the recording medium P is transported in the upper section 42a of the endless belt 42, the ink jet head 48 performs recording by ejecting an ink toward the recording medium P. The recording medium P is transported to the downstream side of the transport path 11 by the belt transport unit 16 while the recording is performed.

To be noted, the "line-type ink jet head" is a head in which a region of nozzles formed in a direction intersecting the transport direction of the recording medium P is provided such that the entirety of the recording medium P is covered in the intersecting direction, and which is used for a recording apparatus that forms an image by fixing one of the head and the recording medium P and moving the other. To be noted, the region of nozzles of the line head in the intersecting direction may be not capable of covering the entirety of all recording medium P supported by the recording apparatus in the intersecting direction.

A first branching portion 50 is provided downstream of the belt transport unit 16 in the transport path 11. The first branching portion 50 is configured to be capable of switching between the transport path 11 through which the recording medium P is transported to the Fd discharge unit 20 or the Fu discharge unit 26, and a reverse path 52 of the reverse path portion 24 in which the recording surface of the recording medium P is inverted and the recording medium P is transported to the recording unit 18 again. To be noted, the recording surface of the recording medium P switched and transported to the reverse path 52 by the first branching portion 50 is inverted in a transport process in the reverse path 52, and the recording medium P is transported again to the recording unit 18 such that a surface opposite to the initial recording surface opposes the ink jet head 48.

A second branching portion 54 is further provided downstream of the first branching portion 50 along the transport path 11. The second branching portion 54 is configured to be capable of switching the transport direction of the recording medium P so as to transport the recording medium P toward the Fd discharge unit 20 or transport the recording medium P toward the Fu discharge unit 26.

The recording medium P transported toward the Fd discharge unit 20 in the second branching portion 54 is discharged through the Fd discharge unit 20 and is placed on the Fd placement portion 22. At this time, the recording medium P is placed such that the recording surface faces the Fd placement portion 22. In addition, the recording medium P transported toward the Fu discharge unit 26 in the second branching portion 54 is discharged through the Fu discharge unit 26 and is placed on the Fu placement portion 28. At this time, the recording medium P is placed such that the surface thereof opposite to the recording surface faces the Fu placement portion 28.

The recording apparatus including the line-type ink jet head described above has a problem of stackablity, and this problem becomes prominent particularly when high-speed sheet transport of 0.5 m/s or faster is required. When the wet frictional drag of the ink jet printing surface is large and a solid image is recorded, problems such as a problem that the sheet does not slide and becomes stuck, a problem that, although when sheets are mostly aligned, neatly aligning the sheets becomes difficult, and thus stapling is displaced arise. In high-speed printing, achieving the stackability becomes more difficult because sheets are stacked before the ink dries. Further, in face-down sheet discharge in which a sheet is discharged with the printing surface facing down, a problem that achieving the stackability becomes more difficult arises because the ink is less easily dried. In addition, since the printing surface swells when printing is performed, there is a problem that permanent curling (primary curling) in which the printing surface has a convex shape immediately after printing occurs. Since the printing surface shrinks as the drying progresses, there is a problem that sheet discharge curling (secondary curling) in which the printing surface come to have a convex shape in ten-plus seconds to several minutes occurs.

In the present embodiment, even in the case of using the line-type ink jet head, by using the ink described above, the curling can be suppressed while reducing the wet frictional drag of the printing surface, and thus the stackability can be improved. Particularly, in the case where ink jet recording is performed while transporting the recording medium P at a high speed of 0.5 m/s or higher, the effect of improving the stackability becomes prominent. In addition, according to the present embodiment, the satellite phenomenon can be sufficiently suppressed.

The ejection speed of the ink by the ink jet method may be 4 to 15 m/s to achieve good flying stability of ink droplets. When the ejection speed is 4 m/s or higher, the ink can be caused to attach to (hit) the recording medium with high precision. In addition, when the ejection speed is 15 m/s or lower, the occurrence of satellite droplets can be effectively suppressed.

Here, the influence of the satellite phenomenon will be described from the viewpoint of the relative speed described above and the length of the tailing described above. For example, in the case of ejecting an ink droplet having the length of tailing of 400 µm at 7 m/s, the hitting time difference between a main droplet and a satellite droplet is about 60 µsec. Therefore, in this case, when the relative speed described above is 0.5 m/s, deviation of hitting position between the main droplet and the satellite droplet is 30 µm based on the hitting time difference described above. In addition, similarly, when the relative speed described above is 1.0 m/s, the deviation of hitting position between the main droplet and the satellite droplet is 60 µm.

Since the deviation of hitting position affects the image quality of the recorded product to be obtained, and the sensitivity of eye of human with respect to the recorded product is known to be likely to sense deviation of 60 µm or larger when the distance between the sheet and the eye is 30 cm, the deviation of hitting position between the main droplet and the satellite droplet may be 60 µm or smaller or 30 µm or smaller.

In addition, in the case where the relative speed is constant, the length of the tailing affects the deviation of hitting position between the main droplet and the satellite droplet. Therefore, an ink having a length of tailing smaller than 400 µm may be used. In addition, by using the ink having a length of tailing smaller than 400 µm, the occurrence of satellite droplets can be effectively suppressed.

As described above, according to the present embodiment, an ink jet recording apparatus that can suppress occurrence of the satellite phenomenon and form an image of high quality at a high speed while improving the stackability can be provided.

To be noted, although a case of using a line-type ink jet head has been described as an example described above, the recording apparatus according to the present embodiment may be a printer (serial printer) including a serial-type ink jet head. The serial printer performs printing by moving the ink jet head in a direction intersecting the transport direction while transporting the recording medium in the transport direction. Also in the serial printer, the problem of stackability arises in the case where the relative speed between the head and the recording medium in printing is a high speed of 0.5 m/s or higher, and therefore the effect of improving the stackability can be achieved by using the ink described above.

Ink Jet Recording Method

An ink jet recording method according to an embodiment of the present disclosure includes ejecting the ink for ink jet recording described above from an ink jet head to a recording medium moving with respect to the ink jet head at a relative speed equal to or higher than 0.5 m/s.

As described above, according to the present embodiment, an ink jet recording method that can suppress occurrence of the satellite phenomenon and form an image of high quality at a high speed while improving the stackability can be provided.

The ink, recording apparatus, and recording method according to the present embodiment can be used without any restriction of used recording medium (for example, regular paper, coated paper, art paper, duplex printing on regular paper, and the like), and the effect thereof is prominent in the case where regular paper is used as the recording medium. Typical examples of the regular paper include so-called pure paper, neutral paper, and photocopying paper.

EXAMPLES

Although the embodiment of the present disclosure will be further specifically described by using examples, the present embodiment is not limited to the examples.
Used Materials
Colloidal Silica As the colloidal silica, Na-type SNOWTEX manufactured by Nissan Chemical Corporation was used. As the silica surface-treated with alumina, C-type SNOWTEX was used.
Fumed Silica As fumed silica (Comparative Examples), AEROSIL (registered trademark) 90 (average primary particle diameter: 20 nm, specific surface area: 90 m$^2$/g) manufactured by Nippon Aerosil was used.
Pigment Dispersion CAB-O-JET300 (product name of CABOT, solid component: 15%) Surfactant OLFINE E1010 (product name of acetylene glycol manufactured by Air Products and Chemicals, Inc.)

SURFYNOL 104 (product name of acetylene glycol manufactured by Nissin Chemical Co., Ltd.)

Triton X-100 (product name of a liner nonionic surfactant manufactured by Roche Applied Science, $C_{14}H_{22}O(C_2H_4O)_n$) Surfactant and pH Adjusting Agent (Unsaturated Fatty Acid)

Oleic acid (monounsaturated fatty acid manufactured by Tokyo Chemical Industry Co., Ltd.)

Linoleic acid (diunsaturated fatty acid manufactured by Tokyo Chemical Industry Co., Ltd.)

Stearic acid (saturated fatty acid manufactured by Tokyo Chemical Industry Co., Ltd.)
pH Adjusting Agent
Amino Acid Trimethylglycine (anhydrous betaine manufactured by Tokyo Chemical Industry Co., Ltd.)

Dimethylglycine (N,N-dimethylglycine manufactured by Tokyo Chemical Industry Co., Ltd.)
Amine Tripropanolamine (triisopropanolamine manufactured by Tokyo Chemical Industry Co., Ltd.)

Triethanolamine (manufactured by Tokyo Chemical Industry Co., Ltd.)
Alkali Metal Hydroxide Potassium hydroxide (manufactured by KANTO CHEMICAL CO., INC)

Sodium hydroxide (manufactured by KANTO CHEMICAL CO., INC) Penetrant 1,2-hexanediol Triethylene glycol monobutyl ether (abbreviated as "TEGmBE" in Table 1)
Wetting Agent Glycerol Trimethylolpropane Examples 1 to 15 and Comparative Examples 1 to 3

Preparation of Ink

Respective components were mixed at contents shown in Table 1, were stirred for 2 hours at a room temperature, filtrated by a membrane filter having a pore diameter of 5 μm, and thus respective inks of Examples 1 to 15 and Comparative Examples 1 to 3 were prepared.

To be noted, the unit of content shown in Table 1 is % by mass, and the content of the pigment dispersion liquid is shown in a solid component density (corresponding to the content of pigment) in Table 1. In addition, a blank space indicates that the component corresponding to the space is not added. In addition, "remainder" of ion exchanged water indicates that the ion exchanged water was added such that the total amount of the ink became 100% by mass.

TABLE 1

| | | | Examples | | | | | | | | | |
|---|---|---|---|---|---|---|---|---|---|---|---|---|
| | | | 1 | 2 | 2 | 3 | 4 | 5 | 5 | 6 | 7 | 8 |
| Ink Composition | Colloidal Silica | 5 nm | | | | | | | | | | |
| | | 10 nm | 3 | | | | 10 | | | | 3 | |
| | | 25 nm | | 6 | | | | 3 | | | | |
| | | 25 nm Silica surface-treatment with alumina | | | 6 | | | | 3 | | | |
| | | 70 nm | | | | | 10 | | | 6 | | |
| | | 80 nm | | | | | | | | | | 6 |
| | Fumed Silica | 25 nm | | | | | | | | | | |
| | Pigment | CAB-O-JET300 | 5 | 5 | 5 | 5 | 5 | 5 | 5 | 5 | 5 | 5 |
| | Surfactant | OLFINE E1010 | 0.2 | | | 0.2 | 0.2 | | | 0.2 | 0.2 | 0.2 |
| | | SURFYNOL 104 | | 0.2 | 0.2 | 0.2 | | 0.2 | 0.2 | 0.2 | | |
| | | Triton X-100 | | | | | | | | | | |
| | Surfactant, pH Adjusting Agent (Unsaturated Fatty Acid) | Oleic Acid | 0.2 | | | 0.2 | | 0.2 | 0.2 | | 0.2 | |
| | | Linoleic Acid | | 0.2 | 0.2 | | 0.2 | | | 0.2 | | 0.2 |
| | | Stearic Acid | | | | | | | | | | |

TABLE 1-continued

|  |  | | | | | | | | | | |
|---|---|---|---|---|---|---|---|---|---|---|---|
| pH Adjusting Agent (Amino Acid) | Trimethylglycine | 5 |  |  |  | 5 | 5 | 5 | 5 |  | 5 |
|  | Dimethylglycine |  | 5 | 5 | 5 |  |  |  |  | 5 |  |
| pH Adjusting Agent (Amine) | Tripropanolamine | 0.2 | 0.2 | 0.2 |  |  | 0.2 | 0.2 | 0.2 |  |  |
|  | Triethanolamine |  |  |  | 0.2 | 0.2 |  |  |  | 0.2 | 0.2 |
| pH Adjusting Agent (Alkali Metal Hydroxide) | KOH |  | 0.1 | 0.1 |  | 0.1 |  |  | 0.1 |  |  |
|  | NaOH | 0.1 |  |  | 0.1 |  | 0.1 | 0.1 |  | 0.1 | 0.1 |
| Penetrant | 1,2-hexanediol | 3 | 3 | 3 | 3 | 3 | 3 | 3 | 3 | 3 | 3 |
|  | TEGmBE | 2 | 2 | 2 | 2 | 2 | 2 | 2 | 2 | 2 | 2 |
| Wetting Agent | Glycerol | 10 | 10 | 10 | 10 | 10 | 10 | 10 | 10 | 10 | 10 |
|  | Trimethylolpropane | 2 | 2 | 2 | 2 | 2 | 2 | 2 | 2 | 2 | 2 |
| Water | Ion Exchanged Water | Remainder | Remainder | Remainder | Remainder | Remainder | Remainder | Remainder | Remainder | Remainder | Remainder |
| Wet Friction of Printed Product |  | B | A | A | A | B | B | B | A | B | B |
| Primary Curling |  | B | B | B | A | B | B | B | A | B | B |
| Secondary Curling |  | A | B | B | B | A | A | A | A | B | B |
| Image Quality (Satellite Phenomenon) |  | A | A | A | A | A | A | A | A | A | A |
| Satellite Phenomenon after 3 Months from Ink Preparation |  | A | A | A | B | A | A | A | B | A | C |
| Satellite Phenomenon after 1 Year from Ink Preparation |  | B | B | A | B | B | B | A | B | B | D |
| Frequency of Nozzle Omission |  | A | A | A | B | A | A | A | B | A | B |

|  |  |  | Examples | | | | | | | Comparative Examples | | |
|---|---|---|---|---|---|---|---|---|---|---|---|---|
|  |  |  | 9 | 10 | 11 | 12 | 13 | 14 | 15 | 1 | 2 | 3 |
| Ink Composition | Colloidal Silica | 5 nm | 6 |  |  |  |  |  |  |  |  |  |
|  |  | 10 nm |  | 3 |  |  | 10 |  | 6 | — |  |  |
|  |  | 25 nm |  |  | 6 |  |  |  |  | — |  | 3 |
|  |  | 25 nm Silica surface-treatment with alumina |  |  |  |  |  |  |  | — |  |  |
|  |  | 70 nm |  |  |  | 10 |  | 6 |  | — |  |  |
|  |  | 80 nm |  |  |  |  |  |  |  | — |  |  |
|  | Fumed Silica | 25 nm |  |  |  |  |  |  |  | — | 6 |  |
|  | Pigment | CAB-O-JET300 | 5 | 5 | 5 | 5 | 5 | 5 | 5 | 5 | 5 | 5 |
|  | Surfactant | OLFINE E1010 | 0.2 |  | — | 0.2 | 0.2 | 0.2 | 0.2 | 0.2 | 0.2 | 0.2 |
|  |  | SURFYNOL 104 |  |  | — |  |  |  |  | 0.2 | 0.2 |  |
|  |  | Triton X-100 |  | 0.2 | — |  |  |  |  |  |  |  |
|  | Surfactant, pH Adjusting Agent (Unsaturated Fatty Acid) | Oleic Acid |  | 0.2 |  |  | — |  | 0.2 | 0.2 | 0.2 | 0.2 |
|  |  | Linoleic Acid | 0.2 |  | 0.2 |  | — | 0.2 |  |  |  |  |
|  |  | Stearic Acid |  |  |  | 0.2 | — |  |  |  |  |  |
|  | pH Adjusting Agent (Amino Acid) | Trimethylglycine | 5 | 5 |  |  | 5 |  |  |  |  | — |
|  |  | Dimethylglycine |  |  | 5 | 5 |  | 5 | 5 | 5 | 5 | — |
|  | pH Adjusting Agent (Amine) | Tripropanolamine |  | 0.2 | 0.2 |  |  | — |  |  |  | 0.2 |
|  |  | Triethanolamine | 0.2 |  |  | 0.2 | 0.2 | — | 0.2 | 0.2 | 0.2 |  |
|  | pH Adjusting Agent (Alkali Metal Hydroxide) | KOH |  |  | 0.1 | 0.1 |  | 0.1 | — | 0.1 | 0.1 |  |
|  |  | NaOH | 0.1 | 0.1 |  |  | 0.1 |  | — |  |  | 0.1 |
|  | Penetrant | 1,2-hexanediol | 3 | 3 | 3 | 3 | 3 | 3 | 3 | 3 | 3 | 3 |
|  |  | TEGmBE | 2 | 2 | 2 | 2 | 2 | 2 | 2 | 2 | 2 | 2 |
|  | Wetting Agent | Glycerol | 10 | 10 | 10 | 10 | 10 | 10 | 10 | 10 | 10 | 10 |
|  |  | Trimethylolpropane | 2 | 2 | 2 | 2 | 2 | 2 | 2 | 2 | 2 | 2 |
|  | Water | Ion Exchanged Water | Remainder | Remainder | Remainder | Remainder | Remainder | Remainder | Remainder | Remainder | Remainder | Remainder |
| Wet Friction of Printed Product |  |  | B | B | B | B | B | B | B | D | D | B |
| Primary Curling |  |  | B | B | B | B | B | B | B | D | C | B |
| Secondary Curling |  |  | A | A | B | B | A | B | B | C | C | D |
| Image Quality (Satellite Phenomenon) |  |  | B | D | D | D | D | D | D | B | C | B |
| Satellite Phenomenon after 3 Months from Ink Preparation |  |  | B | D | D | D | D | D | D | B | C | B |

TABLE 1-continued

| | | | | | | | | | | |
|---|---|---|---|---|---|---|---|---|---|---|
| Satellite Phenomenon after 1 Year from Ink Preparation | B | D | D | D | D | D | D | B | D | B |
| Frequency of Nozzle Omission | B | C | D | D | D | D | D | C | C | D |

Ink cartridges of LX-10000F (line ink jet printer) manufactured by EPSON were filled with the inks shown in Table 1, and experiment was conducted. The recording medium was moved at a relative speed of 0.6 m/s with respect to the head of the printer. Table 1 also shows evaluation results of each evaluation item. Details of each evaluation item will be described below.

Wet Friction

Regarding the wet friction of the printed product, an A4 blank sheet was fixed to a flat surface, an A4 sheet on which a solid image was printed was placed thereon with the printing surface facing the A4 blank sheet immediately after the printing, a 50 g weight was placed thereon, the flat surface was inclined, the angle of the inclination when the A4 sheet with the solid image started to slide with respect to the A4 blank sheet was measured, and it was evaluated that the wet friction was smaller when the angle at which the A4 sheet with the solid image started slide was smaller. The criteria for evaluation were as follows.
A: The inclination angle was smaller than 37°.
B: The inclination angle was smaller than 40°.
C: The inclination angle was smaller than 44°.
D: The inclination angle was equal to or larger than 44°.

Primary Curling

The magnitude of curling in the state in which the printing surface had a convex shape was measured immediately after printing a solid image on an A4 sheet. The criteria for evaluation were as follows.
A: Curling occurred, but rolling did not occur after printing of a solid image on an A4 sheet with a margin of 3 mm.
B: Curling occurred, but rolling did not occur after printing of a solid image on an A4 sheet with a margin of 10 mm.
C: After printing of a solid image on an A4 sheet with a margin of 10 mm, only the edge of the A4 sheet rolled and did not return to the original state.
D: Rolling occurred after printing of a solid image on an A4 sheet with a margin of 10 mm.
*Here, rolling of a sheet corresponds to a state where the sheet has formed a cylindrical shape.

Secondary Curling

The magnitude of curling in the state in which the printing surface had a convex shape was measured after elapse of a predetermined period after printing a solid image on an A4 sheet. The criteria for evaluation were as follows.
A: No deformation of 1 cm or greater was observed after 1 week.
B: Curling was observed but rolling was not observed after 1 week.
C: Rolling was observed after 1 week.
D: Rolling occurred within 1 day.
*Here, rolling of a sheet corresponds to a state where the sheet has formed a cylindrical shape.

Satellite Phenomenon

A ruled line extending in the transport direction of the sheet and having a thickness of 1 pt printed on a super fine paper sheet manufactured by EPSON was observed by a microscope, and whether the satellite phenomenon had occurred was determined by observation. The criteria for evaluation were as follows.

A: Only one ruled line was observed.
B: Two ruled lines were observed at some points.
C: Two ruled lines were observed.
D: Dust-like dots were observed in addition to the ruled line.

Frequency of Nozzle Omission

In printing using the printer described above, the frequency of nozzle omission was evaluated in accordance with the following evaluation criteria.
A: No nozzle was omitted in continuous printing of solid images on 50 A4 sheets.
B: 1 to 5 nozzles were omitted in continuous printing of solid images on 50 A4 sheets.
C: 6 to 20 nozzles were omitted in continuous printing of solid images on 50 A4 sheets.
D: 20 or more nozzles were omitted in continuous printing of solid images on 50 A4 sheets.

From Table 1, it was found that the inks of Examples 1 to 15 containing colloidal silica and amino acid had better stackability than the inks of Comparative Examples 1 to 3 not containing colloidal silica. To be noted, although fumed silica was used in Comparative Example 2, since fumed silica was angular unlike colloidal silica, it is assumed that the effect of reducing the wet friction of the recording surface was insufficient. In addition, it was also found that, in the case where all four of unsaturated fatty acid, amino acid, alkali metal hydroxide, and amine are contained, the occurrence of satellite phenomenon can be stably suppressed for a long period as in Examples 1 to 8.

What is claimed is:

1. An ink for ink jet recording, the ink comprising:
    pigment;
    colloidal silica;
    amine; and
    amino acid,
    wherein the amino acid is trimethylglycine or dimethylglycine, and a content of the amino acid is 4% by mass or more and 20% by mass or less relative to a total mass of the ink, and
    wherein a content of the colloidal silica is 3% by mass or more and 10% by mass or less relative to the total mass of the ink.

2. The ink for ink jet recording according to claim 1, wherein an average particle diameter of the colloidal silica is 10 nm to 70 nm.

3. The ink for ink jet recording according to claim 1, wherein a surface of the colloidal silica is treated with alumina.

4. The ink for ink jet recording according to claim 1, the ink further comprising unsaturated fatty acid.

5. The ink for ink jet recording according to claim 4, wherein the unsaturated fatty acid is oleic acid or linoleic acid.

6. The ink for ink jet recording according to claim 1, the ink further comprising acetylene glycol.

7. The ink for ink jet recording according to claim 1, wherein the amine includes triethanolamine.

8. The ink for ink jet recording according to claim 1, the ink further comprising alkali metal hydroxide.

9. The ink for ink jet recording according to claim 8, wherein the alkali metal hydroxide is potassium hydroxide, sodium hydroxide, or lithium hydroxide.

10. An ink jet recording apparatus comprising:
an ink jet head that ejects the ink for ink jet recording according to claim 1, wherein
the ink jet recording apparatus records an image by attaching, to a recording medium, the ink ejected from the head while moving the head or the recording medium at a relative speed equal to or higher than 0.5 m/s.

11. An ink jet recording apparatus comprising:
a line head having a region of nozzles formed in an intersecting direction intersecting a transport direction of a recording medium, the region covering a printing region of the recording medium in the intersecting direction, wherein
the line head records an image by ejecting the ink for ink jet recording according to claim 1 through the nozzles and attaching the ejected ink to the recording medium.

12. An ink jet recording apparatus comprising:
a line head having a region of nozzles formed in an intersecting direction intersecting a transport direction of a recording medium, the region covering a printing region of the recording medium in the intersecting direction; and
the ink according to claim 1.

13. An ink jet recording method comprising:
ejecting the ink for ink jet recording according to claim 1 from an ink jet head to a recording medium moving with respect to the ink jet head at a relative speed equal to or higher than 0.5 m/s.

14. The ink for ink jet recording according to claim 1, wherein the pigment includes carbon black.

15. The ink for ink jet recording according to claim 1, wherein a content of the pigment is 0.1 to 20% by mass with respect to the total mass of the ink.

* * * * *